A. H. TWELLS.
AUTOMATIC CUT-OFF OR CUSHIONING GEAR FOR DUPLEX PUMPS.
APPLICATION FILED OCT. 7, 1915.

1,296,234.

Patented Mar. 4, 1919.
4 SHEETS—SHEET 1.

WITNESSES.
James Lambert
Joseph Wakefield

INVENTOR.
Arthur Hughes Twells.

A. H. TWELLS.
AUTOMATIC CUT-OFF OR CUSHIONING GEAR FOR DUPLEX PUMPS.
APPLICATION FILED OCT. 7, 1915.
1,296,234.
Patented Mar. 4, 1919.
4 SHEETS—SHEET 2.
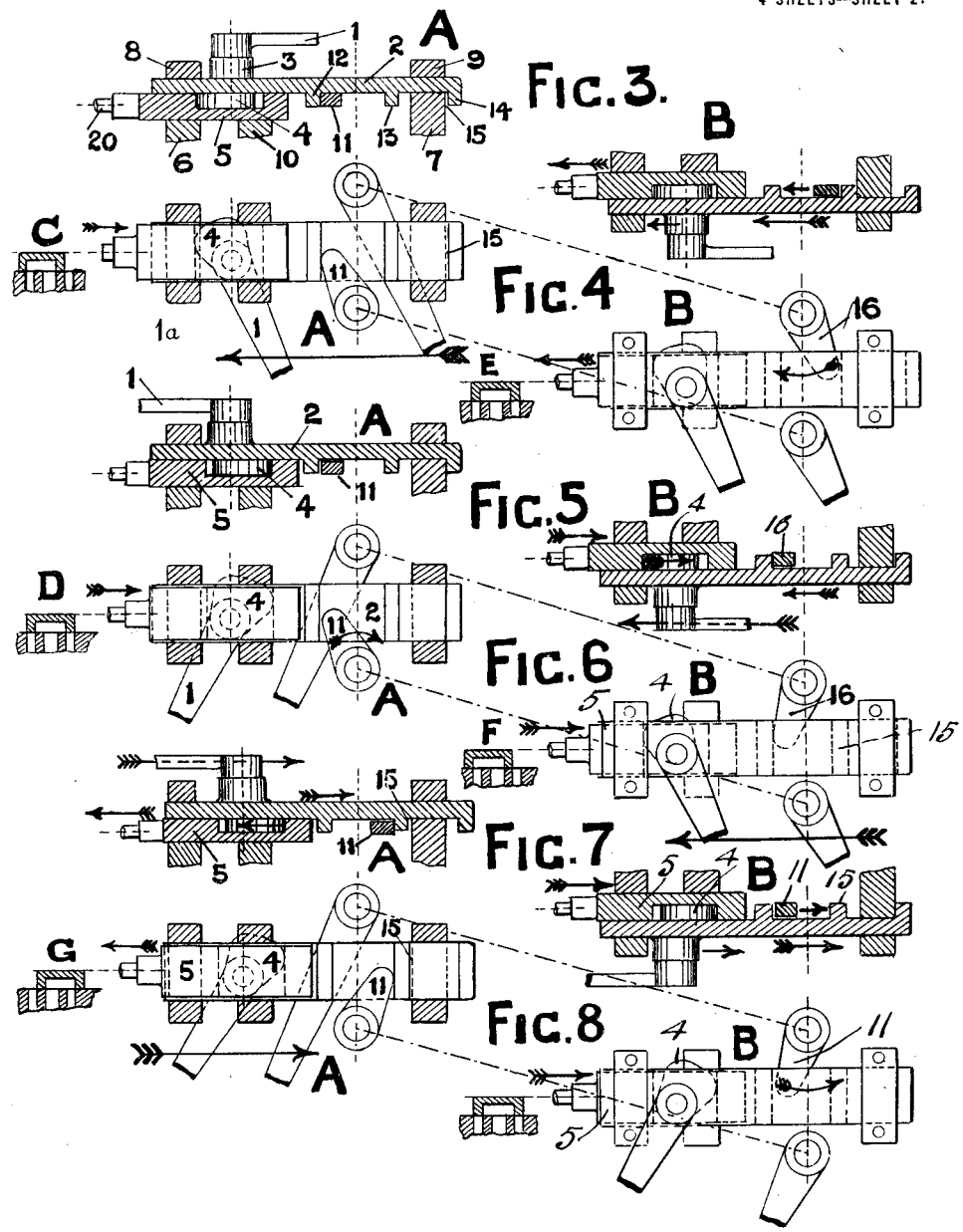
WITNESSES.
James Lambert
Joseph Wakefield
INVENTOR.
Arthur Hughes Twells.

A. H. TWELLS.
AUTOMATIC CUT-OFF OR CUSHIONING GEAR FOR DUPLEX PUMPS.
APPLICATION FILED OCT. 7, 1915.

1,296,234.

Patented Mar. 4, 1919.
4 SHEETS—SHEET 3.

WITNESSES.
James Lambert
Joseph Wakefield

INVENTOR.
Arthur Hughes Twells.

A. H. TWELLS.
AUTOMATIC CUT-OFF OR CUSHIONING GEAR FOR DUPLEX PUMPS.
APPLICATION FILED OCT. 7, 1915.

1,296,234.

Patented Mar. 4, 1919.
4 SHEETS—SHEET 4.

WITNESSES.

INVENTOR.

UNITED STATES PATENT OFFICE.

ARTHUR HUGHES TWELLS, OF TOWNSHIP OF URMSTON, COUNTY OF LANCASTER, ENGLAND.

AUTOMATIC CUT-OFF OR CUSHIONING GEAR FOR DUPLEX PUMPS.

1,296,234.  Specification of Letters Patent.  Patented Mar. 4, 1919.

Application filed October 7, 1915. Serial No. 54,546.

*To all whom it may concern:*

Be it known that I, ARTHUR HUGHES TWELLS, a subject of the King of Great Britain and Ireland, residing at 2 Roseneath Road, in the township of Urmston, in the county of Lancaster and Kingdom of England, have invented a new and useful Automatic Cut-Off or Cushioning Gear for Duplex Pumps or the like, of which the following is a specification; and I do declare the following to be a full, clear, and exact description of the invention, such as will enable others skilled in the art to which it appertains to make and use the same.

My invention relates to duplex pumps and the like, in which one pump operates the steam valve of the other; in this class of pump, retardation at the end of the stroke can be obtained by imprisoning a certain amount of the steam between the piston and the cylinder end, at the end of the stroke, and to accomplish this, double ports are sometimes used, one port for steam inlet, and one port for exhaust outlet, at each end of the cylinder, and these double ports increase the clearance space and thereby reduce steam economy. Another way of retarding the piston is by using a separate cut-off valve, either on or in the slide-valve or its equivalent, but the gear for accomplishing the retardation in this way is complicated. In duplex pumps the usual practice is to admit steam to the pump before the end of its stroke, which cushions the piston and reverses the stroke, but it is obvious that under these conditions there is no appreciable pause or dwell at the end of the stroke, the reversal being momentary; it is the sudden reversal that is largely responsible for the knocking of the water valves of the pump, whereas when a pump pauses or dwells for an appreciable time before reversing, the water discharge valves seat themselves with little or no noise. The objects of my invention are first to obtain a pause or dwell at the end of each stroke of each pump, thereby minimizing or avoiding knock; second to economize steam by means of wiredrawing it during the stroke of the pump, thus producing a virtual cut-off, and third in the case of slow running pumps of using a single port for steam and exhaust at each end of the cylinder, so doing away with the clearance loss due to double ports, and fourth the provision of a safeguard that would prevent the pump should it lose its water, from running away to such an extent as to cause damage to itself or surroundings.

I attain these objects by the mechanism illustrated in the accompanying 4 drawings in which:—

Figures 1 and 2, show two positions of a duplex pump represented with the steam cylinders and valve chamber in section.

Figs. 3, 5, and 7 show a top view of the valve mechanism in section.

Figs. 4, 6 and 8 show a side view of the valve mechanism, and a small diagram of the position of the valve corresponding, the arrows show the direction of movement immediately to follow.

Figure 13:
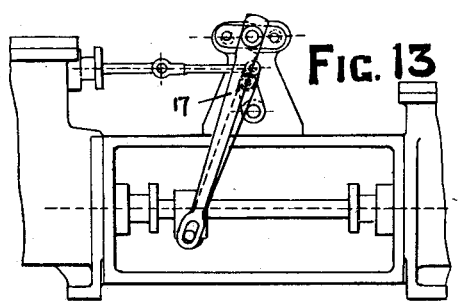
Figures 14, 15:
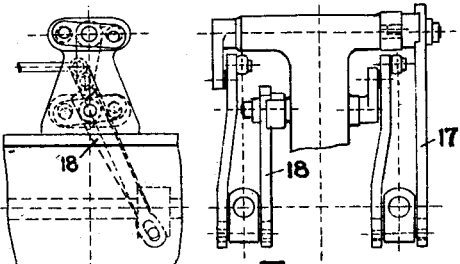

Figs. 13, 14, and 15 show a third modified form.

Figure 16:
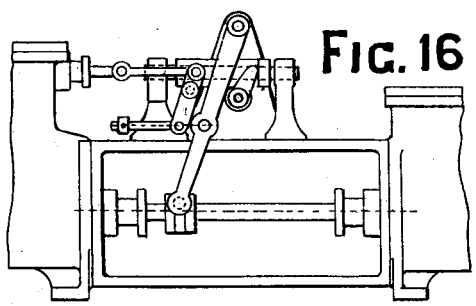

Fig. 16 shows a fourth modified form of gear.

Figure 17:
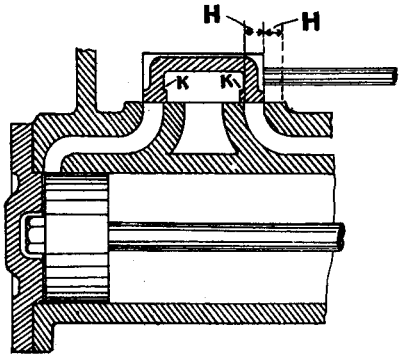
Figure 18:
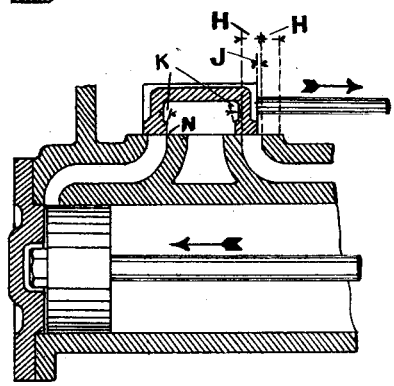
Figure 19:
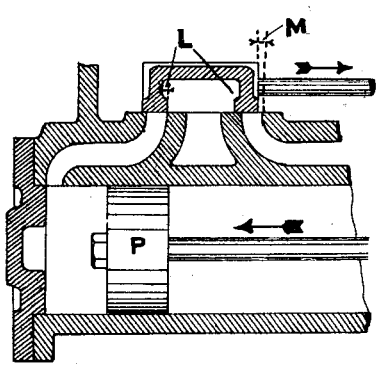

Figs. 17, 18 and 19 show various positions of slide valve.

Figure 20:
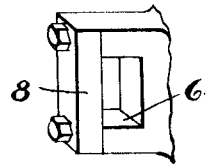

Fig. 20 is a detail perspective view of a bearing and cover hereinafter referred to.

By means of my invention each pump while opening the steam valve of its fellow pump in the usual way, will close its own steam valve by bringing it to mid-position, or partially close it by bringing it nearly to mid-position.

Figure 1:
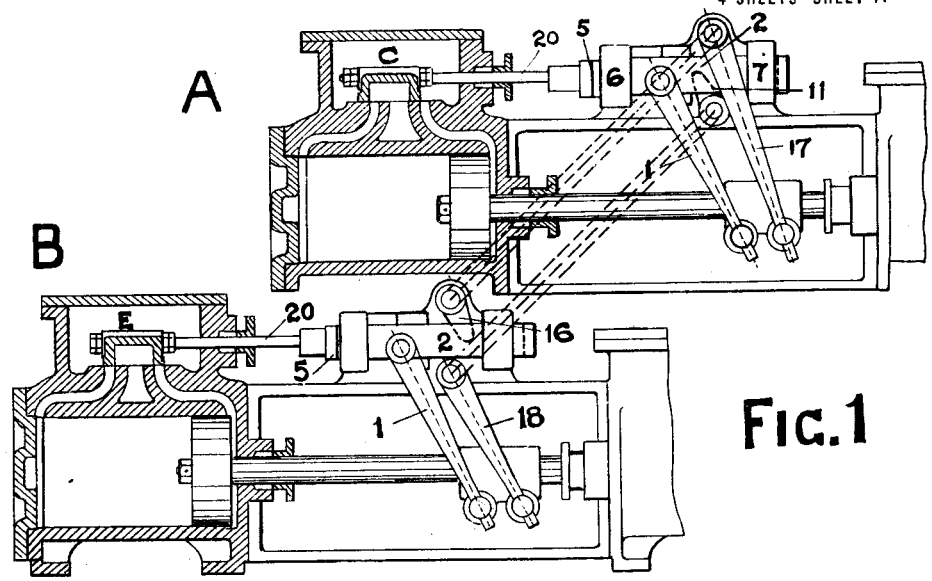

Fig. 1 shows the two units of a duplex pump, marked A and B, in which the unit A for the sake of clearness has been shown higher than and forward of unit B, and for the same purpose the feet are not shown in the upper pump A, and the levers of this pump have been shown in full lines instead of dotted lines. The connecting shafts have been shown dotted in Fig. 1, and apply equally to Fig. 2, but have been left out for the sake of clearness. In each of the Figs. 1 and 2, A and B show the two units forming one duplex pump.

In Fig. 1 it will be seen that the slide valve of A is opened to steam at the right hand end of the cylinder, while B, Fig. 1, has closed its own slide valve.

Figure 2:
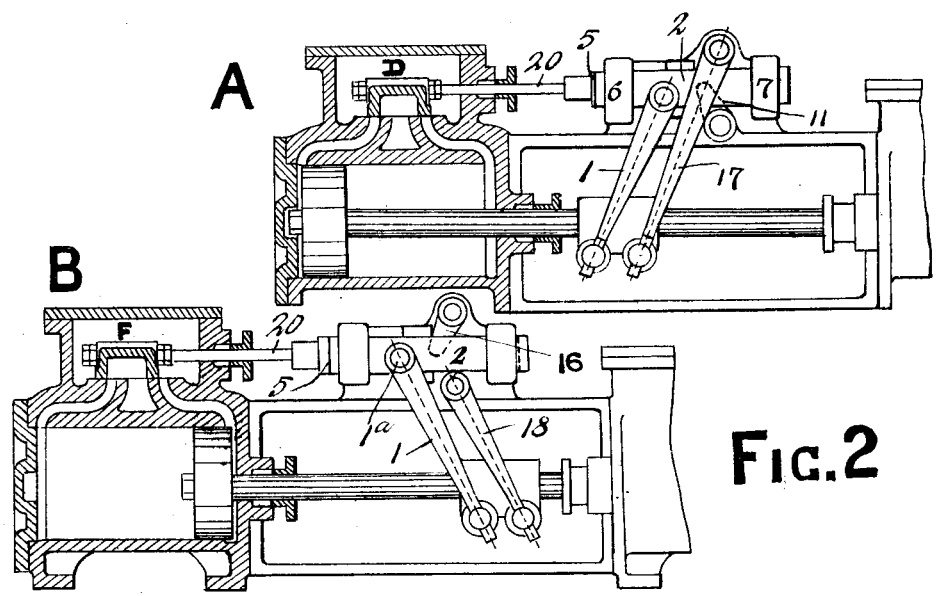

In Fig. 2 pump A has made its stroke from right to left, and brought its slide valve to mid-position, and at the same time has opened the slide valve of pump B at the right hand end. Steam will now enter the right hand end of the cylinder moving the piston, piston rod and crosshead of pump B Fig. 2 from right to left, and by so doing will bring the slide valve of pump B to midposition and will at the same time open the slide valve of pump A Fig. 2 by moving it to the right admitting steam to the left hand end of the steam cylinder, whereupon the pump A will make its stroke from left to right at the same time closing its own slide valve and opening the slide valve of pump B.

The valve mechanism by which this action is achieved is shown in Figs. 3 and 4 which refer to the A and B of Fig. 1. Also by Figs. 5 and 6 referring to Fig. 2, and further by Figs. 7 and 8 which show the position of the valve gear and slide valve, following on and arising out of Fig. 2, of which a general view is not given. In these figures the same letters and figures in each group refer to similar parts.

In A Fig. 3, 1 is the valve closing lever, 2 the sliding bar, its travel which is equal to about half the valve travel, being terminated by the stops on the bar marked 13 and 14, coming up against part of the pump frame marked 7. This bar has a boss 3 upon it, in which an axle 1$^a$ is freely mounted so as to rotate through the arc described by the lever 1; the axle is rigidly connected at one end to lever 1, and at the other to a short lever or cam, which may be of various forms, the short lever or cam being so connected to the axle, that it moves in an opposite direction to lever 1, and therefore an opposite direction to the pump crosshead. A second bar 5 in Fig. 3, slidably mounted on the bar 2 is rigidly connected to the valve spindle 20.

The two bars 2 and 5 in each pump unit are slidably mounted in bearings 6 and 7 which may be provided with removable covers 8 and 9 respectively. One bearing and its cover is shown in detail in Fig. 20. 10 shows a bearing without a cover, which supports one end of bar 5, the bar being slidably mounted therein. 11 shows the end in section of the small lever worked by the adjacent pumps, this lever alternatively coming into contact with one of the stops 12 and 13 on bar 2, and moving this bar through a distance about equal to half the travel of the steam slide valve, first in one direction and then in the other.

In A, Figs. 3 and 5, valve levers are shown in their proper position.

I will now describe the action of the valve gear:—Referring to A in Figs. 1, 3 and 4, the lever 1 is at the right hand and the cam 4 at the left hand, and pump B Fig. 1 having previously made its stroke from left to right, its short lever 11 shown in A Fig. 3 has come in contact with the stop 12 and moved bar 2 from right to left, and as pump A Fig. 1 is stationary, the lower end of its lever 1 is held by the pump crosshead, and therefore the cam 4 in A Figs. 3 and 4, is held by lever 1 in its position on the left, in consequence of this, when the lever 11 shown in A Figs. 3 and 4, moves the bar 2, it also moves the fulcrum 1$^a$ of lever 1 and the cam, and as the cam bears upon the left hand end of the recess in bar 5, it acts as a strut and moves bar 5 and with it the slide valve to the position shown at C in A Fig. 4.

The axle 1$^a$ by which the lever 1 is pivotally mounted in the slide bar 2, constitutes the fulcrum of said lever when movement of the slide bar is prevented as hereinafter described. At other times said axle merely constitutes a pivotal connection for the lever. Therefore the axle 1$^a$ may be termed a movable fulcrum seeing that owing to the movements of the slide bar 2 it is moved from one position to another during the operation of the pump.

In the arrangement shown in Fig. 3 the movement of the slide bar 2 is restricted by the contact of the stops 13 and 14 with opposite sides of the bearing, 7, but it will be noticed that there is a small space shown at 15 indicating that the stop 14 has not come into contact with the rigid bearing 7, the reason of this is, that the piston of pump B Fig. 1, has not come into contact with the cylinder end, the cushioning action caused by the slide valve reducing the passage of the exhaust having terminated the stroke of the piston a slight distance away from the cylinder end, and the space 15 is the fractional part of such distance represented by the ratio of the length of the short lever 11 to the length of the lever 18.

Considering the valve of pump A only in Fig. 1, it is obvious that the pump will now make its stroke from right to left, when the valve will be in the position shown in A Fig. 2 and in A Figs. 5 and 6, indicated by small diagram D. Referring to A Figs. 5 and 6 the lever 1 is now at the left hand, and at a certain point of the stroke of the pump, the cam 4 has come in contact with the bar 5 attached to the slide valve, and as the friction of the slide valve is much more than the friction of the easy moving bar 2 in the bearings 6 and 7, as soon as the cam comes in contact with the bar 5, the fulcrum of the lever 1, and therefore the bar 2 of which it forms a part, moves through the small space marked 15 in A Figs. 3 and 4, the stop 14 bearing against the rigid part 7, and as the lever 1 continues its movement from right to left, it moves the bar 5 to the right, through a space about equal to half the travel of the valve, bringing the valve to position D, thus shutting off the steam to its own cylinder. But while pump A has been doing this, it has opened the steam valve of its fellow pump in the following manner:—When pump A is in the position shown in Fig. 1, its short lever 16—actuating the slide valve of pump B by means of lever 17 through shaft,—is at the right hand as indicated at 16 in B Fig. 4, and therefore when pump A Fig. 1 moves to position shown in A Fig. 2 its short lever as shown at 16 in B, Fig. 2 moves to the left; its position is shown at 16 in B Fig. 6 and it will be seen that it has moved the slide valve of B Fig. 1 to position F in B, Fig. 6.

Pump B Fig. 2 now moves from right to left, causing its short lever 11 in A Fig. 6 to move to position shown at 11 in A Figs. 7 and 8, bringing bar 5 by means of cam 4—held in position by stationary lever 1 in A Fig. 6—to position so that slide valve is brought to G in A Fig. 8, the small space 15 in A Figs. 7 and 8 showing that the piston has not touched the cylinder end, if the piston were touching the cylinder end there would be no space at 15, but the stop would come in contact with the pump frame or bearing. From the foregoing description it will be seen that each pump opens the steam valve of its fellow pump, and closes its own valve, and that by reason of the fulcrum 1ᵃ of lever 1 being movable, the slide valve or its equivalent will always be brought to mid-position, no matter what portion of the stroke of the adjacent or fellow pump remains uncompleted, unless it is desired that the slide valve shall always be brought to a position less than or more than the mid-position. It is in consideration of the last mentioned alternative, that the expression "about equal to half the travel of the valve," is used. In some cases it may be preferable, while completely cutting off the exhaust, to leave the steam port very slightly open; in this case the cam would move the slide valve through rather less than half the stroke, and the main lever of the adjacent pump, through its shaft and short lever, would move the valve through slightly more than half the stroke, and the valve would have a small amount of inside or exhaust lap. The above is shown in Figs. 17, 18, and 19, which show sections of the slide valve, ports and steam cylinder, and an elevation of the steam piston and piston rod. In Fig. 17, the piston is shown at the end of its stroke and the slide valve in mid-position, and while no steam lap is shown,—such not being necessary,—a small amount of exhaust lap is shown at K, K. The valve being in mid-position, and taking the width of the steam port as the half travel of the slide valve, it will be seen that the right hand edge of the slide valve will move through the space H both right and left, in making its full travel. Fig. 18 shows the position of the slide valve at the end of the stroke of the piston, in the case where the steam port is not completely closed by the slide valve, the amount of opening being marked J, the piston rod through its valve lever has not moved the slide valve through half its stroke, or equal to H, but to slightly less than half, or through H less J. When the fellow pump opens the steam cylinder to steam by moving the slide valve to the right, it will move it more than half the stroke or through H plus J. It will be seen that the slide valve owing to exhaust lap has cut off the exhaust at N. Fig. 19 shows that by increasing the exhaust lap, the exhaust can be cut off before the piston gets to the end of its stroke, thereby cushioning the piston P as it proceeds to the end of its stroke, driven by the steam entering through the space M. The increased exhaust lap is shown at L.

To further enable the invention to be clearly understood, the various steps during a complete reciprocation of the pistons of both cylinders i. e., a complete cycle in the operation of the pump will now be described. At commencement the parts occupy the position shown in Figs. 3 and 4. The piston rod and crosshead of pump A makes its inward stroke, and after the proportion of the stroke is made for which the gear is designed or set, its self-closing lever 1 brings the movable fulcrum 2 up against the stop 13 (if not already touching it) and then brings the slide valve of pump A to mid position. At the same time the valve opening lever 17 of pump A which actuates the movable fulcrum 2 of pump B and which during the above proportion of the stroke has had freedom of movement with regard to the movable fulcrum engages with a tappet on the movable fulcrum and moves it to the other end of its stroke, but as the valve closing lever of pump B is connected to this movable fulcrum, one end of said valve closing lever being held by the crosshead of pump B, and the other end attached to the valve spindle, the movement of the movable fulcrum moves that end of the valve closing lever attached to the valve spindle, the end of the valve closing lever attached to the cross-head acting as the fulcrum during this operation. The slide valve of pump B is thus brought to a position so that steam enters the outward end of the cylinder of pump B, the inward end being open to exhaust. The parts will now be in the position shown in Figs. 5 and 6 from which the piston rod and crosshead of pump B makes its inward stroke, and after the proportion of the stroke is made for which the gear is designed or set, its self closing lever 1 brings the movable fulcrum 2 up against the stop 13 (if not already touching it) and then brings the slide valve of pump B to mid position. At the same time the valve opening lever 18 of pump B which actuates the movable fulcrum 2 of pump A and which during the above proportion of the stroke has had freedom of movement with regard to the movable fulcrum, engages with a tappet on the movable fulcrum and moves it to the other end of its stroke, but as the valve closing lever of pump A is connected to this movable fulcrum, one end of said valve closing lever being held by the crosshead of pump A, and the other end attached to the valve spindle, the movement of the movable fulcrum moves that end of the valve closing lever attached to the valve spindle, the end of the valve closing lever attached to the crosshead acting as the fulcrum during this operation. The slide valve of pump A is thus brought to a position so that the steam enters the inward end of the cylinder of pump A, the outward end being open to exhaust. The position of the parts is now as shown in Figs. 7 and 8 from which the piston rod and crosshead of pump A makes its outward stroke, and after the proportion of the stroke is made for which the gear is designed or set, its self closing lever 1 brings the movable fulcrum up against the stop 14' (if not already touching it) and then brings the slide valve of pump A to mid position. At the same time the valve opening lever 17 of pump A which actuates the movable fulcrum 2 of pump B and which during the above proportion of the stroke has had freedom of movement with regard to the movable fulcrum engages with a tappet on the movable fulcrum and moves it to the other end of its stroke, but as the valve closing lever of pump B is connected to this movable fulcrum, one end of said valve closing lever being held, by the crosshead of pump B, and the other end attached to the valve spindle, movement of the movable fulcrum moves that end of the valve closing lever attached to the valve spindle, the end of the valve closing lever attached to the crosshead acting as the fulcrum during this operation. The slide valve of pump B is thus brought to a position so that steam enters the inward end of the cylinder of pump B, the outward end being open to exhaust. In the final operation of the pump which follows that just described and completes the cycle, the piston rod and crosshead of pump B makes its outward stroke, and after the proportion of the stroke is made for which the gear is designed or set, its self closing lever 1 brings the movable fulcrum 2 up against the stop 14' (if not already touching it) and then brings the slide valve of pump B to mid position. At the same time the valve opening lever 18 of pump B which actuates the movable fulcrum 2 of pump A and which during the above proportion of the stroke has had freedom of movement with regard to the movable fulcrum engages with a tappet on the movable fulcrum and moves it to the other end of its stroke, but as the valve closing lever of pump A is connected to this movable fulcrum, one end of said valve closing lever being held by the crosshead of pump A, and the other end attached to the valve spindle, the movement of the movable fulcrum moves that end of the valve closing lever attached to the valve spindle, the end of the valve closing lever attached to the crosshead acting as the fulcrum during this operation. The slide valve of pump A is thus brought to a position so that steam enters the outward end of the cylinder of pump A, the inward end being open to exhaust. The parts thus again reach the position shown in Figs. 3 and 4 completing the cycle of operations.

Figure 9:
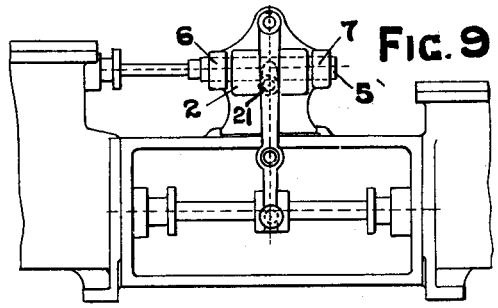
Figs. 9 and 10 show a modified form of gear.
Figure 10:
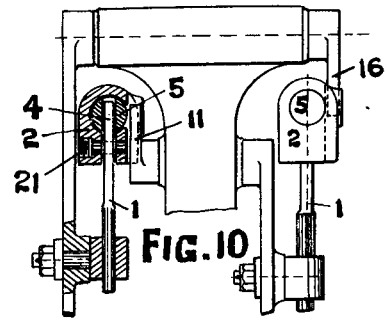

In Figs. 9 and 10 a modified form of mechanism is shown. Fig. 9 shows an elevation of the long lever side of pump. Fig. 10 shows a cross section through the parts 2 and 5 and section and end elevation of swiveling blocks on pump levers.

In this form of the valve mechanism, the pump crosshead need only be long enough to actuate a single lever directly, the second lever is actuated by the first, by means of a block mounted rotatively in the first lever, and receiving the end of the second lever which is mounted slidably in the block. 2 in Fig. 9 is the equivalent of bar 2 in Fig. 3, its travel being terminated by rigid parts 6 and 7; it is fitted with a removable pin 21, forming the fulcrum of the second lever, in which parts 1 and 4 are in one piece. The part 4 in Fig. 10 actuates a round bar 5, which is rigidly connected to the valve spindle, and can be withdrawn by removing pin 21, and lowering lever 1, so that upper end 4 will clear the round bar.

It will be seen that a recess is formed on one side of the part 2, to receive the levers 11 and 16.

Figure 11:
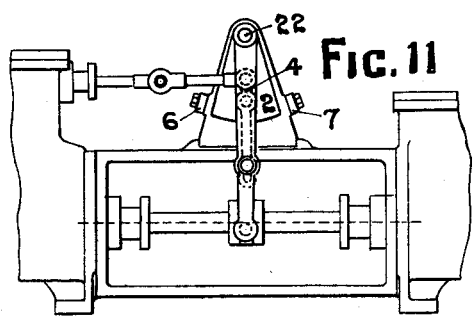
Figs. 11 and 12 show a second modified form.
Figure 12:
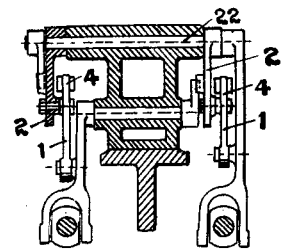

In Figs. 11 and 12 an arrangement is shown in which part 2 has the form of a swinging link or quadrant, pivoted freely on the shaft 22 and free to swing between stops 6 and 7, having a travel about equal to half the travel of the slide valve.

Figs. 13 and 14 and 15 show another method in which my invention may be arranged, in this case the valve opening levers 17 and 18 are mounted rotatively on the shafts, and have a recess at their upper end which engages with a short bar rigidly connected to the shaft, there being sufficient clearance between the recess and the bar to permit the lever 17 or 18 to make a certain portion of its stroke, during which it would pivot idly upon the shaft, on the completion of this portion of the stroke of the pump the recess would engage with the bar, and would move the bar and with it the shaft through a certain arc of a circle, such that the end of the short lever rigidly fixed to the opposite end of the shaft would move through a distance about equal to half the travel of the valve. Each of the short levers in this arrangement would have the function of the part 2 in Figs. 3 and 4, while the valve spindle would have the function of part 5 in Figs. 3 and 4. The amount of movement of the ends of the small levers is definite and is limited by any suitable method, or arrangement of stops, in Figs. 13 and 14 this is done by means of pins rigidly fixed to the bar, these pins having a certain freedom of movement in a diametrical direction in holes provided in the pump frame, the play of the pin in each hole being that required to allow the end of the short lever to move through a distance about equal to half the travel of the valve. The pins have the function of the stops 13 and 14 in Figs. 3 and 4, and the inside walls of the holes have the function of the rigid part of the pump frame or bearing 7 in Figs. 3 and 4.

In Fig. 16, a further modification is shown in which lever 1 is moved by a rod fitted with tappets, and one end of which is connected to the main lever of the pump.

The expression "slide valve or its equivalent," in the body of this specification, includes valves of the piston or Corliss type, and the valve may be in one or more parts, but separate expansion valves or cut-off valves working in connection with slide valves or their equivalent, in which a double or complex movement is required, are not included in the hereinbefore mentioned expression. My invention relates to pumps and the like, of the simple high pressure or multiple expansion type, and though a horizontal type has been shown in the drawings accompanying this specification, it applies equally to the vertical type. This invention relates to steam driven pumps and also to pumps for exhausting or compressing or blowing air or other gases, and to pumps or compressors actuated by water, compressed air, or other liquids or gases.

Hereinafter in the claims the term "fixed stops" is used, and for purpose of explanation it should be here stated that this term refers, in the form shown in Figs. 1 to 8, to the opposite sides of the fixed bearing 7 with which sides the stops 13 and 14 on the movable member 2 make contact. In the form shown in Figs. 9 and 11 the stops 6 and 7 constitute the "fixed stops" while in the form shown in Figs. 13 and 14 the fixed stops are constituted by the sides of the holes in the pump frame in which the pins have a certain freedom of movement.

Having described the nature of my said invention, I do declare that I claim as follows:

1. In a duplex pump, each pump having valves, valve operating mechanism comprising means including in each pump a movable member, a fulcrum upon said movable member, a valve operating lever mounted on said fulcrum, a second lever for shifting said movable member of the opposite pump, said second lever being capable of a certain amount of free movement as regards said movable member, and fixed stops to terminate the movement of the movable member, the valve of either pump being opened by a movement of its valve operating lever effected by the shifting of the movable member carrying the fulcrum of the said lever brought about by the second lever of the opposite pump at the termination of its free movement, and the closure of the valve of each pump being effected by an actuation of its valve operating lever by its own pump, said lever prior to closing the valve shifting the movable member carrying its fulcrum up to one of the fixed stops toward which it was previously moved by the second lever of the opposite pump.

2. In a duplex pump, each pump having valves, valve operating mechanism comprising means including in each pump a movable member, a fulcrum upon said movable member, a valve operating lever mounted on said fulcrum, a second lever for shifting said movable member of the opposite pump, said second lever being capable of a certain amount of free movement as regards said movable member, and fixed stops to terminate the movement of the movable member, the valve of either pump being opened by a movement of its valve operating lever effected by the shifting of the movable member carrying the fulcrum of said lever brought about by the second lever of the opposite pump at the termination of its free movement, and the partial closure of the valve of each pump being effected by an actuation of its valve operating lever by its own pump, said lever prior to partially closing the valve shifting the movable member carrying its fulcrum up to one of the fixed stops toward which it was previously moved by the second lever of the opposite pump.

In testimony whereof I affix my signature in the presence of two witnesses.

ARTHUR HUGHES TWELLS.

Witnesses:
 JOSEPH DAKEFIELD,
 JAMES LAMBERT.

Copies of this patent may be obtained for five cents each, by addressing the "Commissioner of Patents, Washington, D. C."